United States Patent [19]

Arisaka et al.

[11] Patent Number: 4,995,298

[45] Date of Patent: Feb. 26, 1991

[54] APPARATUS FOR ROTATABLY SUPPORTING AND FEEDING ELONGATED ROD MEMBER

[75] Inventors: Tomokichi Arisaka; Mitsuyoshi Yamaguchi, both of Nagano, Japan

[73] Assignee: Kabushiki Kaisha ALPS Tool, Japan

[21] Appl. No.: 112,094

[22] Filed: Oct. 21, 1987

[30] Foreign Application Priority Data

Oct. 24, 1986 [JP] Japan .................................. 61-253271
May 28, 1987 [JP] Japan .................................. 62-129946

[51] Int. Cl.$^5$ .............................................. B23B 5/14
[52] U.S. Cl. .......................................... 82/127; 82/124
[58] Field of Search ................... 82/25, DIG. 5, 38 A, 82/30

[56] References Cited

U.S. PATENT DOCUMENTS 4,406,190 9/1983 Mason .................................. 82/124

Primary Examiner—Frederick R. Schmidt
Assistant Examiner—Lawrence Cruz
Attorney, Agent, or Firm—Ladas & Parry

[57] ABSTRACT

An elongated rod member supporting apparatus is disclosed which is provided in a rod feeding machine having a frame positioned adjacent a working machine. The apparatus rotatably supports the elongated member and feeds the same to the working machine. The apparatus comprises a plurality of rod supporting units, damper means and oil supplying means. The plurality of rod supporting units are each positioned spaced away and are arranged along a length of the rod feeding machine. The unit has both axial end portions provided with bearing portions for rotatably supporting the elongated member. The damper means is provided between each of the rod supporting units and the frame of the rod feeding machine for elastically supporting the rod supporting units. The oil supplying means is provided for supplying oil to each space defined between the bearing portions and the elongated rod member.

4 Claims, 8 Drawing Sheets

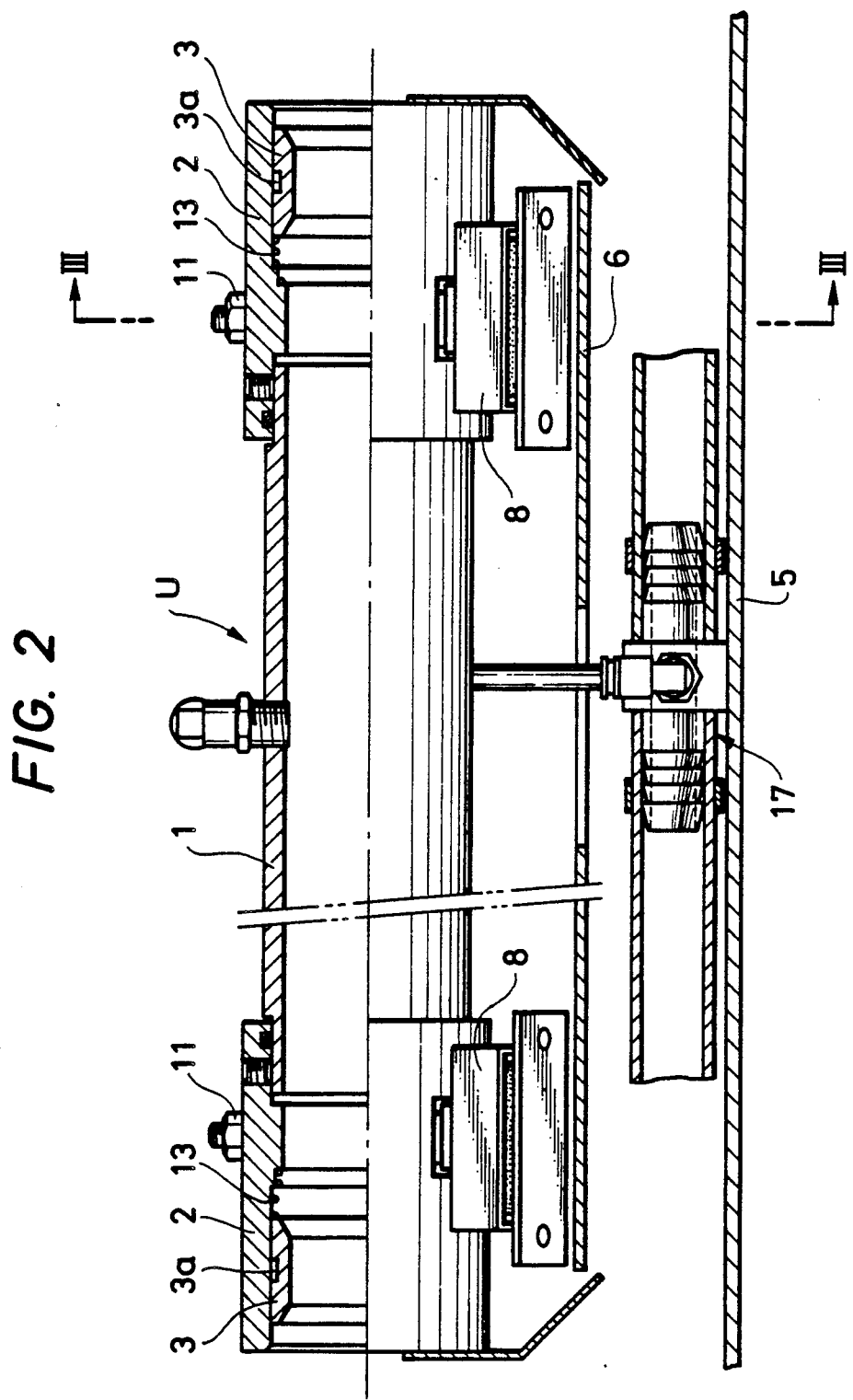

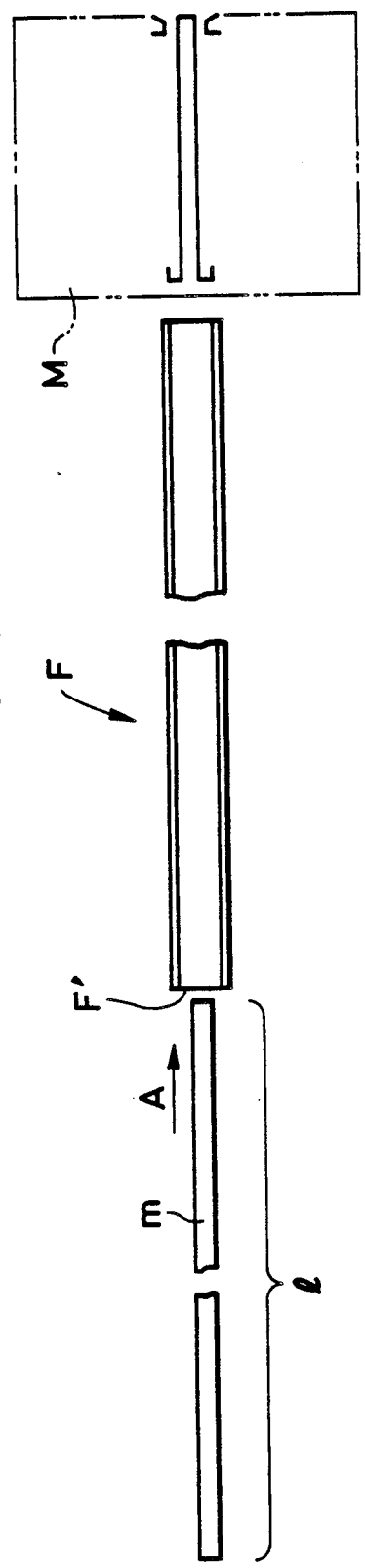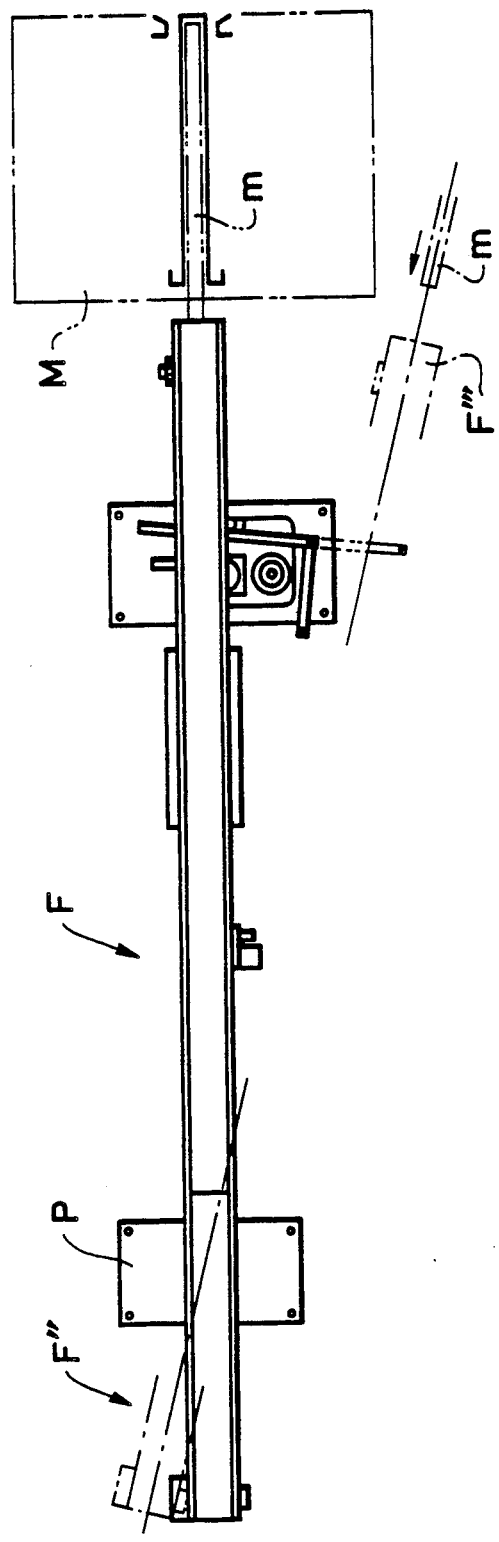
FIG. 10(a)
FIG. 10(b)

APPARATUS FOR ROTATABLY SUPPORTING AND FEEDING ELONGATED ROD MEMBER

BACKGROUND OF THE INVENTION

The present invention relates to an elongated rod feeding machine for feeding the elongated rod member or bar member to a working machine such as an automatic lathe, and more particularly, to an apparatus for rotatably supporting the elongated member and for continuously supplying the same to the working machine. The apparatus is applied to the elongated rod feeding machine for feeding the elongated rod to the working machine.

When an elongated member or a long bar is subjected to machining by a working machine such as an automatic lathe, the bar member must be rotationally supported. For the purpose, the rod feeding machine is provided adjacet the lathe for continuously feeding the elongated member thereinto and for rotatably supporting the same during machining.

According to a conventional rod supporting structure, the rod feeding machine is provided with a single elongated support tube which allows insertion of the elongated member thereinto along its entire length for rotatably supporting the elongated member by the entire inner peripheral surface of the support tube. Pressurized oil is filled in the interior of the support tube, and the elongated member in the tube is floatingly and rotatably supported by the swirling oil flow in the support tube.

However, in the conventional structure, only a low speed rotation is available, and if the elongated member is bent and if the bending exceeds a tolerable range, it would be impossible to floatingly support the elongated member due to insufficient oil swirling motion. Further, if excessively bending rod is inserted into the support tube, the rod provides excessively offsetting rotation, by which the rod may but-contact with the inner surface of the support tube. Accordingly, it would be impossible to perform machining. In other words, in the conventional apparatus, only a linearly extending member is applicable to the supporting structure.

In another aspect, according to the conventional rod feeding machine, when a new elongated rod member m is required to be placed on the rod feeding machine F, the rod be inserted from an upstream end F' of the rod feeding machine as shown in FIG. 10(a). (Here, the term "upstream" is defined with respect to rod feeding direction to the working machine.) Therefore, sufficient axial space is required so as to initially place the rod to the upstream side of the feeding machine F, which space has a length l which is substantially equal to an axial length of the rod feeding machine. Alternatively, the rod feeding machine has an upstream portion F" provided with pivot mechanism P, to thus offset the downstream end of the feeding machine L from the upstream end of the working machine. As a result, the elongated member is insertable into the rod feeding machine from its downstream end F''' thereof as shown in FIG. 10(b).

With this structure, even though the space having a length l in FIG. 10(a) is not required, it would be rather troublesome to install a new elongated member into the rod feeding machine. Further, lateral space is also required for allowing pivotal movement of the rod feeding machine, which space is not required during machining, but required only at the installation of the rod into the feeding machine.

SUMMARY OF THE INVENTION

It is therefore, an object of the present invention to overcome the above-mentioned prior art disadvantages and to provide an improved apparatus for feeding and rotatably supporting an elongated member.

Another object of the invention is to provide such apparatus capable of installing the elongated member having a bent portion, yet performing sufficient rotational supporting and feeding the rod member.

Still another object of the invention is to provide the apparatus which can dampen and absorb any vibration due to offsetting rotation of the bent elongated member.

Still another object of the invention is to provide such structure which can allow the elongated member to be readily installed thereon eliminating ineconomical installation space.

Briefly, and in accordance with the present invention, an apparatus for rotatably supporting and feeding an elongated rod member in a rod feeding machine having a frame includes a plurality of rod supporting units, damper means and oil supplying means. The plurality of rod supporting units are positioned spaced away from each other and are arranged along a length of the rod feeding machine. Each of the rod supporting units has both axial end portions provided with bearing portions for rotatably supporting the rod member. The damper means is provided between each of the rod supporting units and the frame of the rod feeding machine for elastically supporting the units. The oil supplying means is provided for supplying oil to each spaced defined between the bearing portion and the elongated rod member. Even if the elongated rod member has a bent portion, one of the units in contact with the bent portion is subjected to vibaration due to offsetting rotation of the rod member, and the vibration is dampened and absorbed by the damper means. Therefore, high speed rotation is also available even by the application of bent rod member. Further, direct frictional contact between the rod and the bearing portion is eliminated because of the continuous oil supply to a space therebetween.

According to a second embodiment of the present invention, each of the rod supporting units includes upper and lower bodies, and the upper body is pivotably supported to the lower body. An open space is provided above the lower body upon opening of the upper body. Therefore, elongated rod member is easily installed on the rod supporting units by merely opening the upper bodies, dropping the rod member onto the lower bodies, and closing the upper bodies, eliminating rod installation space. Oil is supplied to a space between the bearing portion and the rod member when the upper bodies are closed.

BRIEF DESCRIPTION OF THE DRAWINGS

In the drawings;

FIG. 2 is an enlarged cross-sectional view showing an essential portion of the elongated rod supporting apparatus according to the first embodiment;

DETAILED DESCRIPTION OF THE PREFERRED EMBODIMENTS

Figure 1:
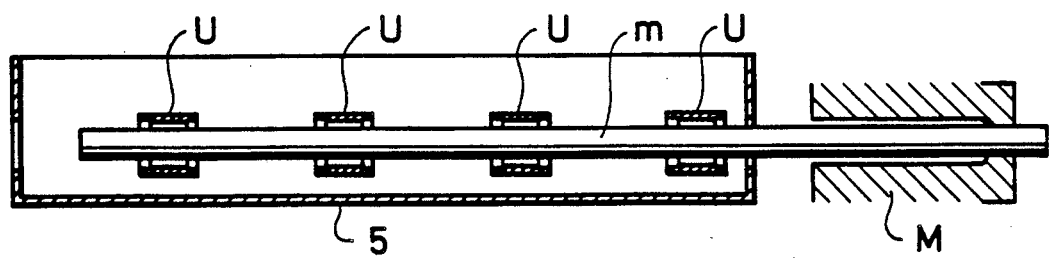
FIG. 1 is a schematic elevation showing an elongated rod supporting apparatus according to a first embodiment of the present invention.

A first embodiment of the present invention will be described with reference to FIGS. 1–4. In FIG. 1, a plurality of supporting units U for supporting an elongated rod member m are arranged with a predetermined space from each other and along a rod feeding machine disposed adjacent a main spindle M of a working machine such as an automatic lathe. As best shown in FIG. 2, each of the supporting units U includes a cylindrical sleeve member 1, bushing supports 2 disposed at both axial end portions of the sleeve member 1 and bushings 3 each disposed in the bushing support 2 in order to provide bearing function with respect to the elongated rod member m.

Figure 3:
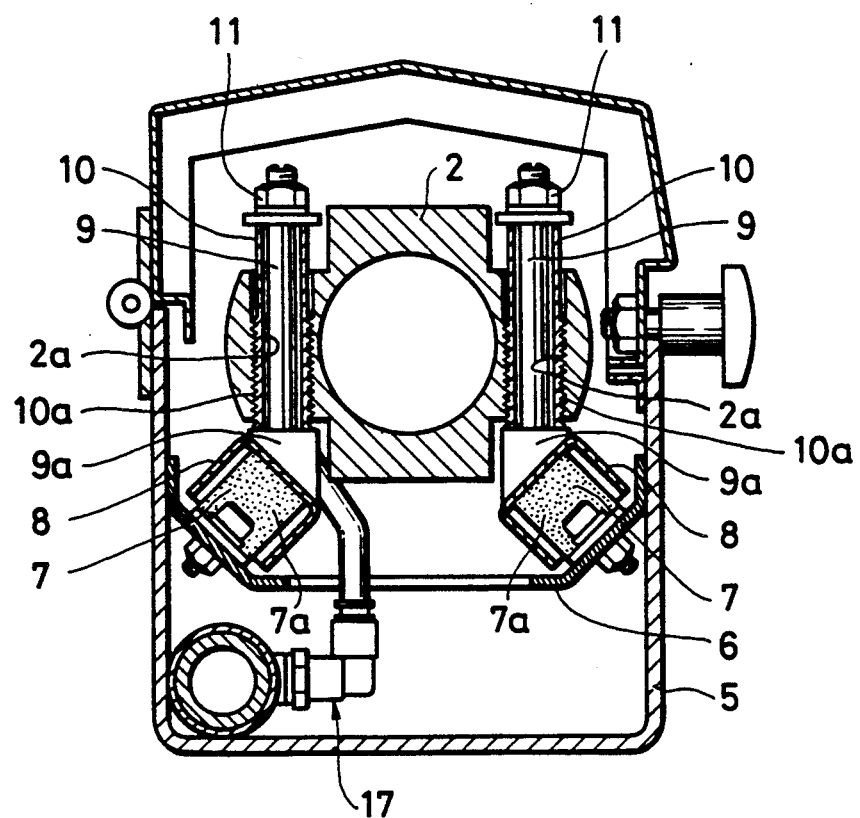
FIG. 3 is a vertical cross-sectional side view taken along the line III—III of FIG. 2.

As shown in FIG. 3, each of the supporting units U is elastically supported by a frame 5 through the bushing support 2. That is, the frame 5 which also serves as an oil pan is integrally provided with a supporting plate 6 to which elastic damper means 7 including anit-vibration rubber stem or post 7a is fixedly secured. In the first embodiment, four damper means are provided per unit U. Each of the elastic damper means 7 is fixed, through a cover member 8, to a bolt head 9a having a triangular cross-section, and a stem portion of a bolt 9 is covered with a collar 10 which is urged toward the bolt head 9a by a nut 11. Each of the rubber stem or post 7a is directed obliquely with respect to the vertically extending bolt stem, so that the vertical load applied to the rubber stem 7a is resolute to at least two directions. The collar member 10 has an outer peripheral surface formed with a male thread 10a, and the bushing support 2 has a transverse side portions at which female threads 2a are formed. The male thread 10a is threadingly engaged with the female thread 2a, so that the supporting unit U is fixed to the collar member 10. The supporting unit U is subjected to its vertical position control by unfastening the nut 11 for allowing the collar member 10 to be rotated, to thereby perform axial position control of the bushing 3. This control is made by selecting at least one of the four damper means 7.

Figure 4:
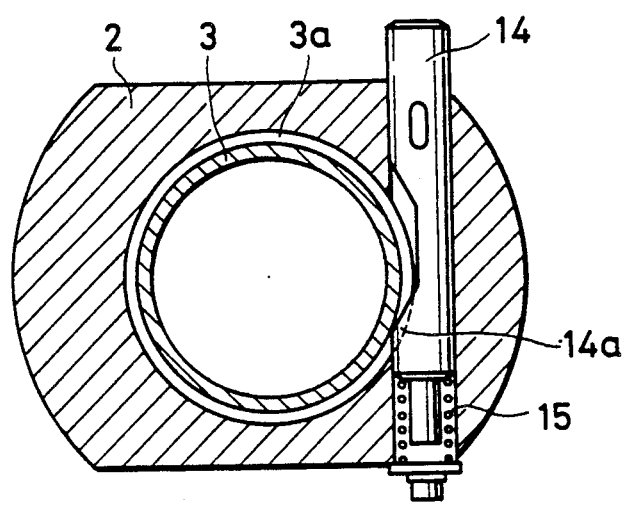
FIG. 4 is a cross-sectional view showing a bearing bush and a detachable pin those used in the rod supporting apparatus in the first embodiment.

As shown in FIG. 2, an inner peripheral surface of the bearing support 2 is formed with a stepped portion with which the bushing 3 is slidably fitted. A compressive coil spring 13 has one end in contact with a stepped end of the support 2 and the other end in contact with a planar end of the bushing 3, so that the bushing 3 is normally urged toward ends of the support 2. An outer peripheral surface of the bushing 3 is formed with an annular groove 3a with which a locking portion 14a of a detachable pin 14 is interlocked as shown in FIG. 4. By this locking engagement between the groove 3a and the locking portion 14a, the bushing 3 is maintained in the bushing support at a given position against the biasing force of the spring 13. The detachable pin 14 is movable in its axial direction against a biasing force of a coil spring 15. For example, in FIG. 4 if the pin 14 is pushed downwardly against the biasing force of the spring 15, the locking portion 14a is disengaged from the annular groove 3a, so that the bushing 3 can be removed from the bushing support 2. Therefore, according to the first embodiment, the bushing 3 can be readily exchanged in accordance with the outer diameter of the elongated rod member m to be machined.

As shown in FIGS. 2 and 3, an oil supply unit 17 is provided below the supporting unit U and within the frame 5. Oil is supplied from the oil supply unit 17 to an upper position of the sleeve member 1. The oil is supplied to the inner portions of the sleeve member 1 and the bushing support 2, and is continuously distributed into a space defined between the bushing 3 and the elongated rod member m.

With the construction, the elongated rod member m fed to the rod feeding machine is rotatably supported by the bushings 3 of the supporting unit U arranged with a given space with respect to the other. In this case, the oil is continuously dripped from the spaced defined between the bushing 3 and the rod member m, and the dripped oil is retrieved by the frame 5 which serves as the oil pan. An oil pump (not shown) is provided within the oil pan and at the bottom portion thereof so as to recirculate the collected oil to the space. An oil film provided between the bushing 3 and the rod member m prevents the rod member from its direct contact with the bushing 3. Further, the oil performs cooling function for the rod member and the bushing.

If the elongated rod member m includes a bending portion, one of the supporting units U which supports the bending portion may be vibrated due to the offsetting rotation of the bent rod member. However, this vibration is dampened and absorbed by the elastic support 7. This damper means 7 has resonance frequency smaller than the rotational frequency of the working machine, to thus avoid resonance of the supporting unit U.

Figure 5:
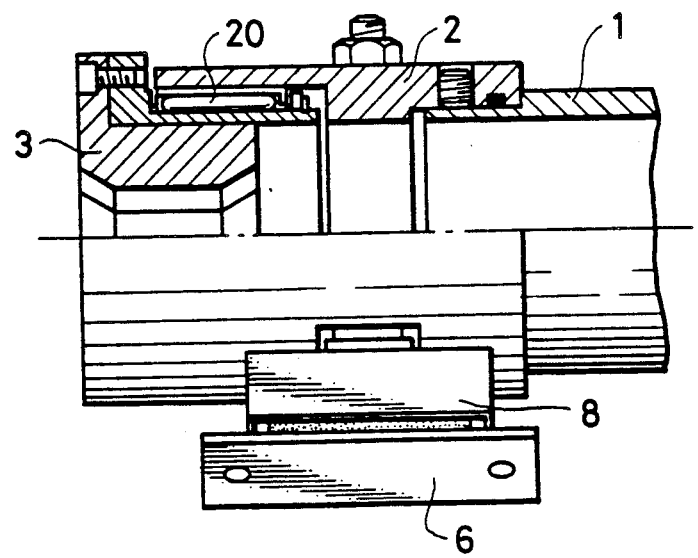
FIG. 5 is a partial cross-section showing a modification to the embodiment shown in FIG. 1.

FIG. 5 shows an embodiment modifying the first embodiment. In FIG. 5, a needle bearing 20 is interposed between the bushing 3 and the bushing support 2, so that the bushing 3 is rotated together with the rotation of the rod member m.

According to the first embodiment of the present invention, even if the elongated rod member including the bent portion is rotated at high velocity, and such rod member provides vibration, the vibration can be absorbed and dampened by the elastic support members, since the rod member is rotatably supported by a plurality of supporting units spaced away from each other, and since each of the supporting units is elastically supported by the damper means. Therefore, the rod member having bent portion is also available for high speed rotation and machining. Further, each of the supporting units is provided with the bushing at its axial end portions for rotatably supporting the rod member and oil is continuously supplied to the space defined between the rod member and the bushings, and therefore, direct frictional contact therebetween is eliminated.

A second embodiment of the present invention will be described with reference to FIGS. 6 through 9. Generic inventive concept of the second embodiment is the same as that of the first embodiment with respect to the provision of the plurality of supporting units and elastic supporting structure for supporting the plurality of supporting units. However, an improvement is made in terms of initial setting of the elongated rod member to the plurality of supporting units. That is, in the latter embodiment, it is unnecesary to succesively insert the elongated member into the supporting unit from a downstream end of a unit which is disposed immediately adjacent the main spindle. Instead, the elongated member can be set to the all supporting units simultaneously by merely dropping the member onto the supporting units.

Figure 6:
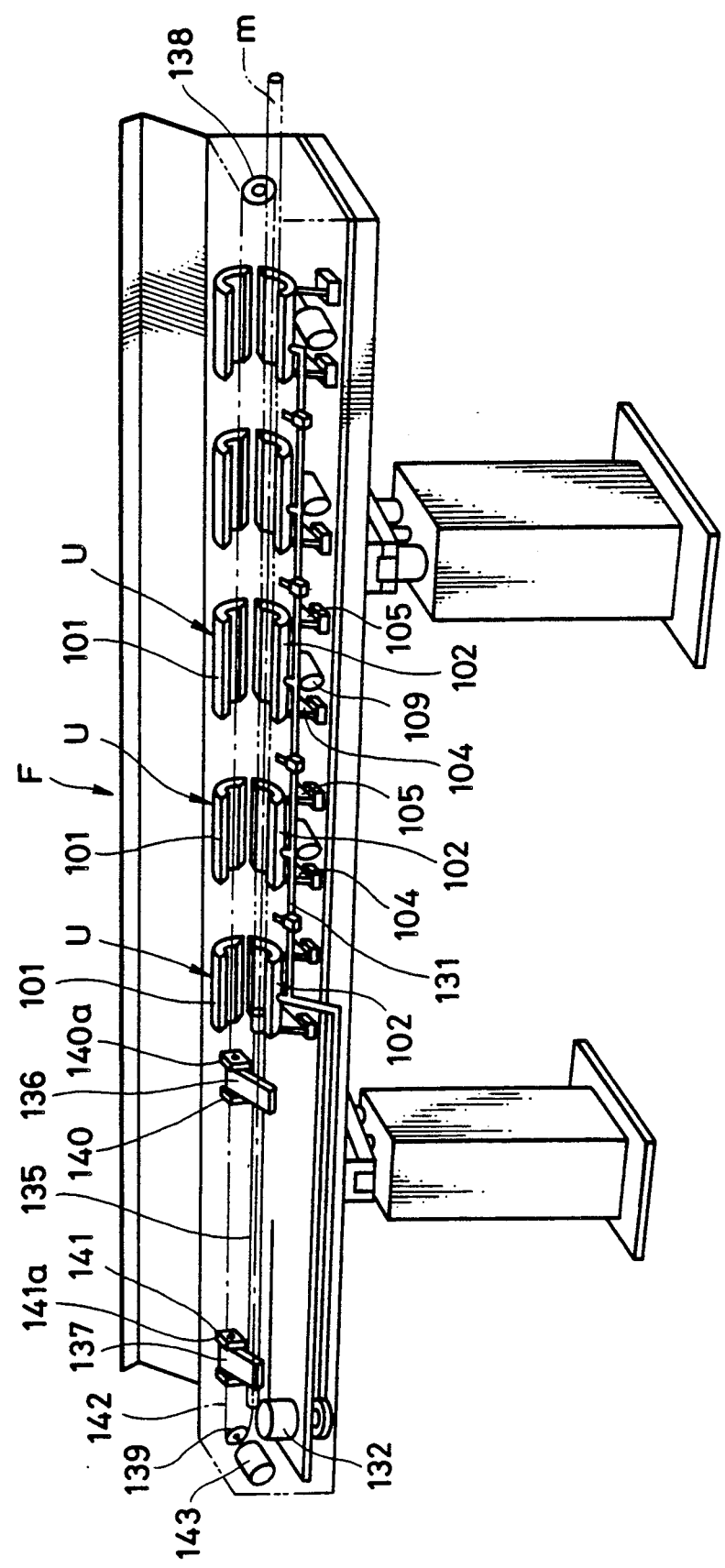
FIG. 6 is a perspective view showing a rod supporting mechanism provided with a rod supporting apparatus according to a second embodiment of the invention.
Figure 7:
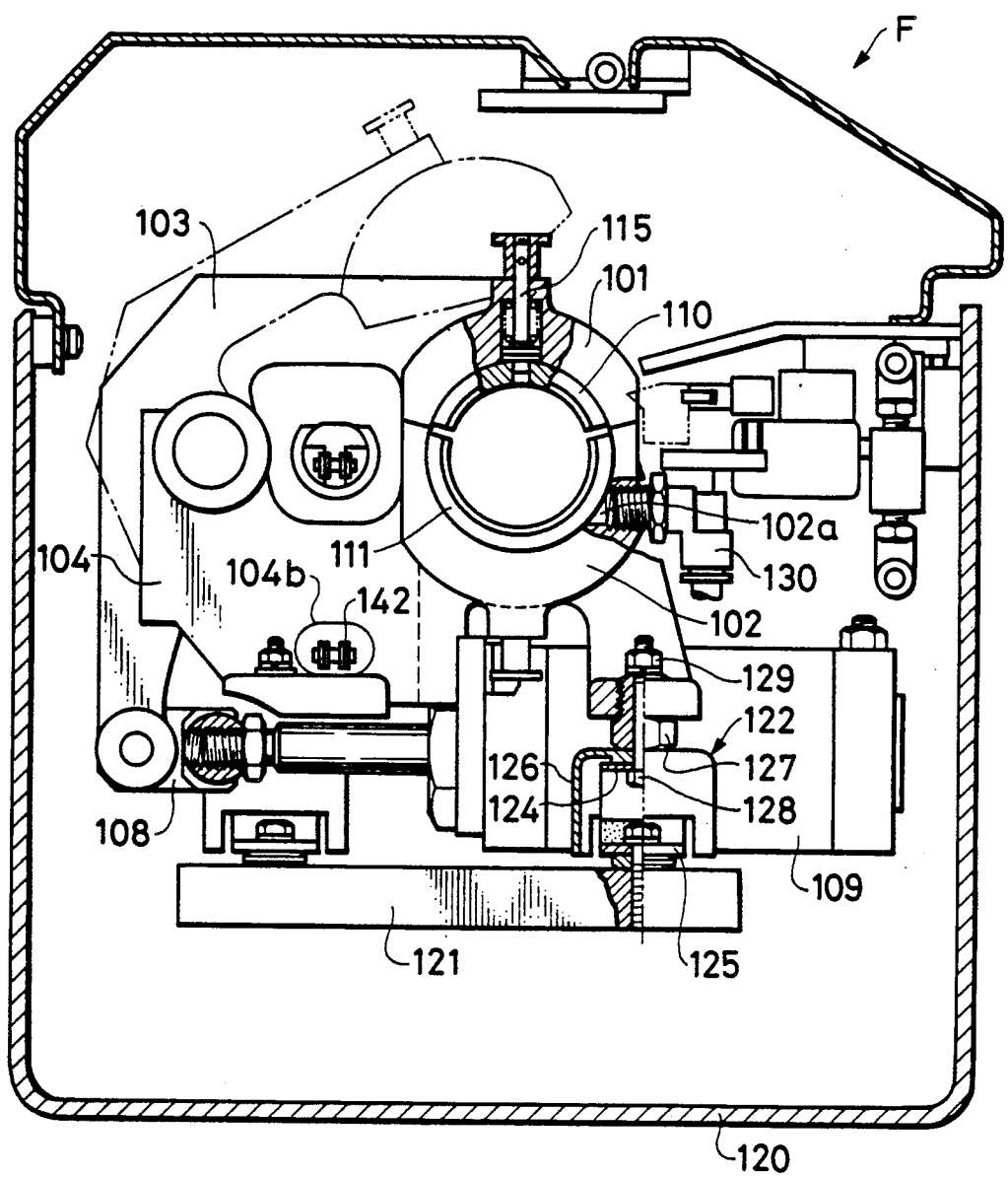
FIG. 7 is an enlarged cross-sectional side view shown an essential portion according to the second embodiment.
Figure 8:
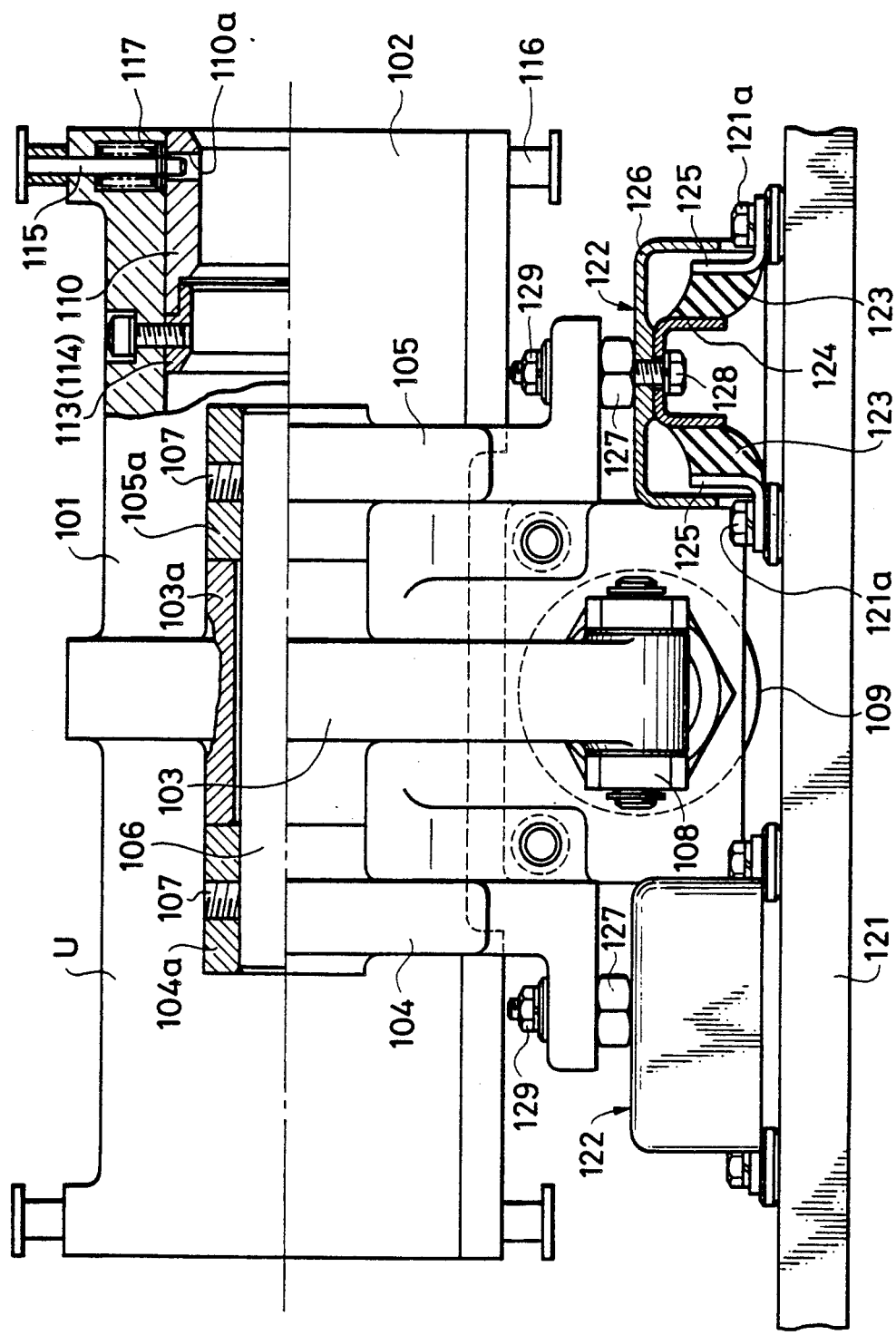
FIG. 8 is a front view of the rod supporting apparatus according to the second embodiment.

FIG. 6 shows a perspective view showing an elongated rod member supporting structure for use in a rod feeding machine F according to the second embodiment. Similar to the first embodiment, a plurality of supporting units U for rotatably supporting an elongated rod member m are disposed spaced away from each other by a predetermined interval. Each of the supporting unit U includes, as shown in FIGS. 7 and 8, a semi-cylindrical lower body 102 and a semi-cylindrical upper body 101 pivotally secured to the lower body. The upper body 101 is provided with an arm 103 at an axially central portion thereof, and the lower body 102 is provided with support plates 104, 105 at both side portions thereof. The arm 103 has a bearing portion 103a interposed between bearings 104a and 105a of the support plates 104 and 105. A pivot shaft 106 extends through the bearings 103a 104a and 105a, and the bearings 104a and 105a are fixed to the pivot shaft 106 by way of screw member 107, while the bearing 103a allows the pivot shaft 106 to be rotated. Therefore, the arm 103 is rotatable about the pivot shaft 106. A lower end of the arm 103 is coupled with a stem portion of an air cylinder 109 through a link 108. Upon actuation of the air cylinder 109, the arm 103 pivots about the pivot shaft 106, so that the upper body 101 is opened or closed with respect to the lower body 102 as best shown in FIG. 6.

Support bushings 110 and 111 are fixed to inner peripheral surface of the upper and lower bodies, respectively, at both axial end portions thereof. To be more specific, subdivided rings 113 and 114 are fixedly secured to the upper and lower bodies 101 and 102, and axially inner end portions of the support bushing 110 and 111 are in abutment with the subdivided rings. Axially outer end portions of the support bushings 110 111 are formed with hole 110a (hole at bushing 111 is not shown in the drawings) with which fixing pins 115 and 116 are engageable. With the arrangement, the support bushings 110 and 111 are fixed to the upper and lower bodies. Compressive springs 117 are disposed over the fixing pins, to thereby normally urge the pins toward the holes 110a, to thus maintain locking engagement between the pins and the bushings. When the fixing pins are pulled to a direction opposite the holes, i.e., radially outwardly, aganist the biasing force of the spring 117, the support bushings 110 and 111 can be removed from the upper and lower bodies 101 and 102. Therefore, the bushings having diameters different from one another is replaceably used in accordance with the elongated rod members each having different diameters.

Figure 9:
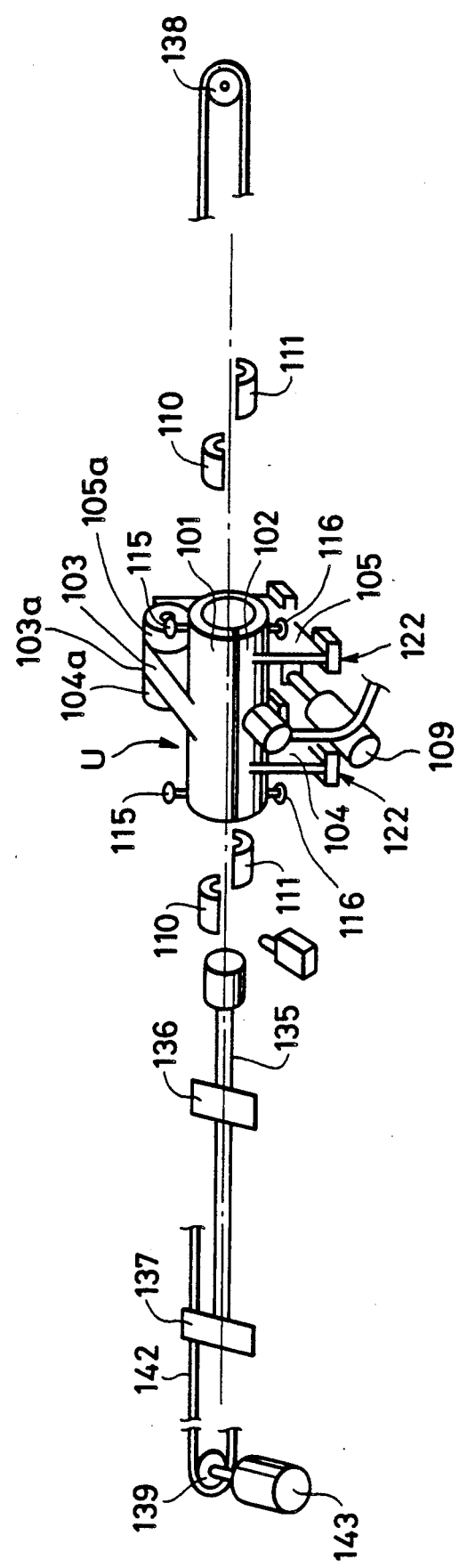
FIG. 9 is an exploded segmental view showing essential mechanical parts employed in the second embodiment; and, FIGS. 10(a) and 10(b) are schematic illustrations showing conventional rod feeding machines.

As best shown in FIG. 7, a base plate 121 is fixed to a frame 120 which also functions as an oil pan. In FIG. 7, means for fixing the base plate to the frame is not delineated. Four elastic damper means 122 are fixed to the base plate 121 for elastically supporting each ones of supporting units U. That is, as shown in FIG. 8, each of the elastic damper means 122 includes a pair of antivibration rubbers 123, an inverted U-shaped upper bracket 124, and a pair of L-shaped lower bracket 125. The lower brackets 125 are fixed to the base plate 121 by bolts 121a. Each of the rubbers 123 is fixedly secured to and interposed between the upper and lower brackets, so that the rubbers are integral with the base plate 121. The upper baracket 124 is covered by a protective cover 126, and a nut 127 for controlling axial alignment is fastened to the upper bracket 124 through a bolt 128 and a nut 129. Further, lower end portion of the support plates 104 and 105 are fixed to the control nut 127, so that the support unit U is fixed to the elastic damper means 122. With the structure, each of the supporting units U is supported by the antivibration rubbers 123 in the four elastic damper means 122 as shown in FIGS. 8 and 9, so that the unit U is elastically movable in both horizontal and vertical directions. The axial alignment with repect to neighbouring supporting units U is performed by unfastening the nut 129 and rotating the control nut 127 in order to selectively allow the support plates 104 and/or 105 to move in vertical direction.

As shown in FIG. 7, the lower body 102 of each of the supporting units U is formed with an oil inlet 102a into which an oil supply plug 130 is inserted. Each of the oil supply plug 130 is in fluid communication with an oil pump 132 disposed at a bottom portion of the oil pan (frame 120) through an oil tube 131 as shown in FIG. 7. With the arrangement, oil is supplied into an internal portion of the support bushings 110 and 111 through the lower support bushings 110 and 111 through the lower support body 102, whereby oil is continuously supplied to a space defined between the elongated member m and the support bushing 110, 111.

For better understanding a resultant constuction of the rod feeding machine F, a feed pipe 135 is disposed at an upstream side thereof, i.e., the portion the farest from a working machine such as lathe in order to feed the elongated member m toward the working machine. The feed pipe 135 is integrally provided with locking pieces 136 and 137 at end portions thereof. At upstream and downstream end portions of the frame 120, sprockets 138 and 139 are provided, and an endless chain 142 is mounted between the sprockets. A driving motor 143 is positioned at one end of the rod feeding machine and is coupled to one of the sprockets 139 in order to drivingly move the chain 142. The chain 142 integrally provides sliders 140 141 those being provided with locking recesses 140a and 141a with which the locking pieces 136 and 137 of the feed pipe 135 are engaged, so that the feed pipe 135 is reciprocally movable together with the slider 140 141. Incidentally, the support plates 104 and 105 are formed with openings 104b to allow the chain 142 to pass therethrough.

In operation, the elongated rod member m supplied to the rod feeding machine F is rotatably supported by the support bushings 110 111 of each of the rod supporting units U spaced away from each other at predetermined intervals along the lengthwise direction of the rod feeding machine F. In this case, oil is continuously supplied to the spaced defined between the support bushings 110 111 and the rod m, and the service oil is collected by the frame 120 which functions as the oil pan. The oil provides oil film between the support bushings 110 111 and the rod member m, and therefore, direct surface contact therebetween is obviated, and the oil film also acts as cooling medium for cooling the rod and the bushings.

If the elongated rod member includes bent portion, one of the rod supporting units located exactly at the bent portions may being to be vibarated upon rotation of the rod member. However, the vibration can be dampened and absorbed by the elastic damper means 122 including the anti-vibration rubber. Similar to the first embodiment, the rubber has a resonance frquency smaller than the rotation frequency of the working machine to avoid resonance.

When a new elongated rod member m is required to be set to the rod feeding machine F, each of the air cylindres 109 at each of the rod supporting units U is actuated to pivot the upper body 101 to thereby provide one space, and thereafter, the new elongated rod member m is dropped onto each lower bodies. Again, the air cylinders 109 are actutated to close the upper bodies with respect to the lower bodies 102.

For the continuous feeding of the rod into the working machine, the driving motor 143 is energized to rotate the sprocket 139, so that the sliders 140 141 are moved toward the working machine for pushingly moving the elongated memer m toward the working machine. As a result, continuous feeding of the rod to the working machine is obtainable.

In view of the above, according to the second embodiment, unsatifactory offsetting rotation due to the rotation of the bent elongated member is still available for the machining because of the dampening and absorption of the vibration at the supporting unit, since there are plurality of supporting units each spaced away and arranged along a length of the rod feeding machine, and since each of the supporting units is provided with the elastic damper means. The technical effect mentioned above is the same as that of the first embodiment. However, in the second embodiment, each of the supporting units includes upper and lower bodies and the upper bodies are pivotably supported to the lower bodies, so that the elongated member is easily supported by the supporting units by opening the upper bodies, and dropping the enlarged member onto the lower bodies, and closing the upper bodies. Therefore, the second embodiment requires less space for installing the elongated member to the rod feeding machine eliminating any swingable movement of the rod feeding machine.

While the invention has been described in detail and with reference to specific embodiments thereof, it will be apparent to one skilled in the art that various changes and modifications can be made therein without departing from the spirit and scope of the invention.

We claim:

1. An elongated rod member supporting apparatus provided in a rod feeding machine having a frame for feeding and rotatably supporting said elongated rod member to a working machine, said apparatus comprising:

a plurality of rod supporting units each positioned spaced away and arranged along a length of said rod feeding machine, each of said rod supporting units having both axial end portions provided with bearing portions for rotatably supporting said elongated rod member;

damper means provided between each of said rod supporting units and said frame for elastically supporting said rod supporting units;

means for supplying oil to each space defined betweens said bearing portions said elongated rod member;

each of said rod supporting units comprising a bushing support for internally supporting said bearing portions, said bushing support being supported by said damper means;

each of said bearing portions being formed with an annular groove, and further comprising a locking pin engageable with said annular groove and a coil spring interposed between said brushing support and said bearing portion, each of said bearing being urged toward axial ends of said rod supporting unit by said coil spring.

2. The apparatus as claimed in claim 1, further comprising needle bearings each being interposed between said bushing support and said bearing portion.

3. The apparatus as claimed in claim 1, further comprising means for controlling axial alignment between each said rod supporting units, said alignment means being disposed betweens said damper means and said bushing support and connecting said damper means to said bushing support.

4. The apparatus as claimed in claim 1, wherein said oil is continuously supplied to said space.

* * * * *